(12) United States Patent
Wing

(10) Patent No.: US 7,494,198 B2
(45) Date of Patent: Feb. 24, 2009

(54) CORNER COVER FOR A CABINET

(75) Inventor: Forrest P. Wing, Des Moines, IA (US)

(73) Assignee: Maytag Corporation, Benton Harbor, MI (US)

( * ) Notice: Subject to any disclaimer, the term of this patent is extended or adjusted under 35 U.S.C. 154(b) by 280 days.

(21) Appl. No.: 10/879,590

(22) Filed: Jun. 30, 2004

(65) Prior Publication Data

US 2006/0001339 A1    Jan. 5, 2006

(51) Int. Cl.
*A47B 96/04* (2006.01)

(52) U.S. Cl. ............................ 312/406.2; 312/265.5

(58) Field of Classification Search .......... 312/265.5, 312/401, 406, 406.2; 220/592.02, 592.06, 220/592.07, 592.08; 248/220.1; 403/289, 403/291, 344, 409.1
See application file for complete search history.

(56) References Cited

U.S. PATENT DOCUMENTS

| 2,214,187 A | | 9/1940 | Swedman |
| 2,286,109 A | * | 6/1942 | Rundell ................. 220/592.08 |
| 2,329,755 A | | 9/1943 | Goulooze |
| 2,348,812 A | | 5/1944 | Heath |
| 2,358,221 A | | 9/1944 | Drake |
| 2,527,932 A | | 10/1950 | Iwashita |
| 2,940,632 A | | 6/1960 | Dickinson et al. |
| 3,915,328 A | | 10/1975 | Hawes et al. |
| 4,196,952 A | * | 4/1980 | Crowe ........................ 312/236 |
| 4,496,072 A | * | 1/1985 | Fleck .................... 220/592.06 |
| 4,805,370 A | * | 2/1989 | Gerdes ..................... 52/717.05 |
| 6,209,175 B1 | * | 4/2001 | Gershenson ................. 24/297 |
| 6,471,313 B1 | | 10/2002 | Ueda et al. |

FOREIGN PATENT DOCUMENTS

EP    81249    6/1983

* cited by examiner

*Primary Examiner*—Janet M. Wilkens
*Assistant Examiner*—Timothy M Ayres
(74) *Attorney, Agent, or Firm*—Kirk Goodwin; Michael D. Lafrenz

(57) ABSTRACT

A cabinet includes a decorative corner cover for concealing unfinished corner regions of the cabinet. The cabinet includes laterally spaced side walls that are joined by a top wall to form corner regions having an opening. The cover member includes a main body having first and second ends with the first end having a tab element that projects substantially perpendicularly from the main body portion. The tab element is preferably cylindrical and formed with a longitudinal slot that creates a radial spring. The tab element further includes a hook member integrally formed with the cylindrical element. The cylindrical element is inserted into the opening so that the hook member engages with the cabinet. The radial spring provides a biasing force that retains the cover in place. Preferably, the opening is constituted by a slot providing additional gripping surfaces for the hook member.

10 Claims, 5 Drawing Sheets

CORNER COVER FOR A CABINET

BACKGROUND OF THE INVENTION

1. Field of the Invention

The present invention pertains to the art of cabinets and, more particularly, to a cover member for concealing adjoining end sections of front face portions of an appliance cabinet.

2. Discussion of the Prior Art

In constructing a cabinet, particularly a refrigerator cabinet, it is highly desirable to minimize the weight of the cabinet shell to reduce manufacturing, transportation and additional associated costs, yet it is imperative that the cabinet be structurally sound in order to counteract loads exerted thereon without deforming. Mainly due to cost efficiencies and flexibility in workmanship, it has been commonplace to utilize sheet metal in the forming of most refrigerator cabinets on the market today. Since sheet metal is thin and rather high loads tend to be concentrated on the shell, particularly by the opening and closing of a weighted-down refrigerator door, a fair amount of effort has been applied in this art to provide reinforcement for such a refrigerator cabinet shell. Of course, an additional important concern is also the ease of assembly, as well as the overall aesthetic appearance of the cabinet.

With this in mind, it has been proposed to form side and top walls of a refrigerator cabinet shell out of a single piece of bent sheet metal and then to attach thereto rear and bottom walls. That is, the side walls and top wall are integrally formed by bending a single piece of sheet metal forming corner regions. Front edge portions of the side and top walls are in-turned to form front face portions of the cabinet. In most cases, each of the front face portions include end sections that terminate at the corner regions. With this arrangement, the end sections of the side walls adjoin the end sections of the top wall so as to define a gap or seam at each corner region.

Some manufacturers, in order to provide a more finished look for their appliances, install a plastic, cosmetic cover, such as indicated at 2 in FIG. 1, over the gap or seam. As shown, cover 2 includes a first end 3 having a pin 5 and tab member 7 that is inserted into an opening at the corner of the cabinet. Cover 2 also includes a second end 9 having a flexible clip 12. Once pin 5 is inserted into the opening, clip 12 is deflected so as to engage with front face portions formed from the top wall and a respective one of the side walls of the cabinet. With this arrangement, a central portion 14 of cover 2 will extend over and conceal the gap, as well as an unfinished portion of the cabinet.

In other cases, a cover is simply glued or otherwise secured to the front face portion of the cabinet. In still other cases, the gap is filled with caulk or another type of sealant. In general, just using caulking or the like is not considered to be as aesthetically pleasing as employing a cover. Unfortunately, repeated opening and closing of the refrigerator door can cause the various prior art attachment methods to allow the cover to become loose and/or fall off, exposing unfinished portions of the cabinet. In addition, flexing of the cabinet that occurs during fabrication and delivery may also cause the cover to become loose.

Therefore, despite the existence of corner covers for refrigerator cabinets, there still exists a need for a corner cover having a more robust attachment structure. More specifically, there exists a need for a corner cabinet cover having an attachment structure adapted to withstand the rigors of assembly, as well as the stresses associated with daily use.

SUMMARY OF THE INVENTION

The present invention is directed to a cosmetic cover for corner regions of a cabinet, such as a refrigerator cabinet. In accordance with the invention, the cabinet includes first and second, laterally spaced, upstanding side walls that are interconnected by a top wall. At the point where the side and top walls meet, corner regions are formed. Both the side walls and top wall include in-turned flanges that define respective front face portions of the cabinet. The front face portions include corresponding end sections that adjoin at the corner regions. As end sections of the side walls adjoin end sections of the top wall at the corner regions, respective openings are established.

In accordance with the invention, the openings in the corner regions are defined by a gap established between the adjoining end sections of the particular front face portions. Actually, each end section includes a flange element that projects into the gap. Opposing flange elements are joined to increase the overall structural integrity of the cabinet, particularly at the corner regions. Joining the flange elements creates a slotted opening having three substantially straight edges.

In accordance with the most preferred form of the invention, the cover member extends across portions of the adjoining end sections to conceal unfinished portions of the cabinet. Preferably, the cover member includes a main body portion having longitudinally spaced first and second ends. More preferably, the first end includes a tab element that projects substantially perpendicularly from the main body portion. The tab element includes a split that creates a spring, and a hook member. When the tab element is inserted into the opening in the corner region, the spring biases the hook member outward to grip respective front face portions of the cabinet.

In further accordance with the most preferred form of the invention, the tab element is constituted by a cylindrical member and the hook member is formed integrally with the cylindrical member. More specifically, the hook member includes three prongs that engage with the three substantially straight edges of the slotted opening. In this manner, once the cylindrical member and hook member are inserted into the slotted opening, the radial spring biases the prongs outward, thereby establishing a robust connection with the cabinet.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
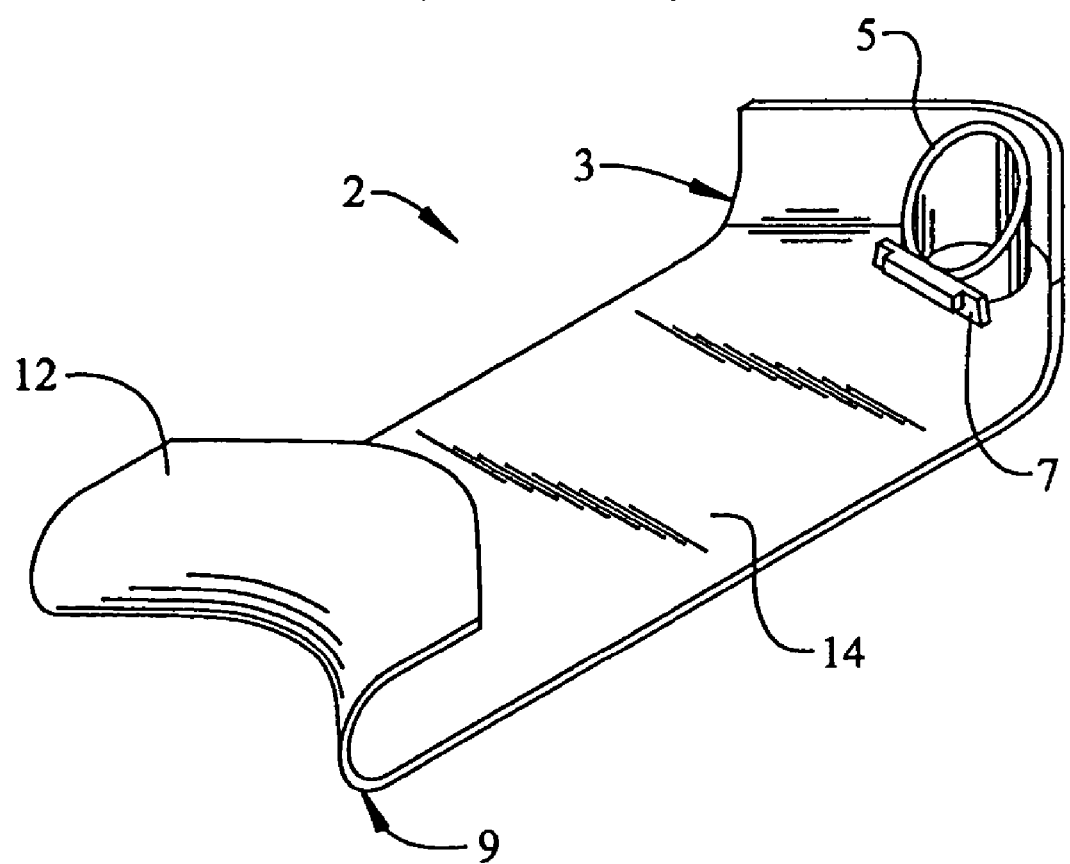
FIG. 1 is an upper right perspective view of a cover member constructed in accordance with the prior art.
Figure 2:
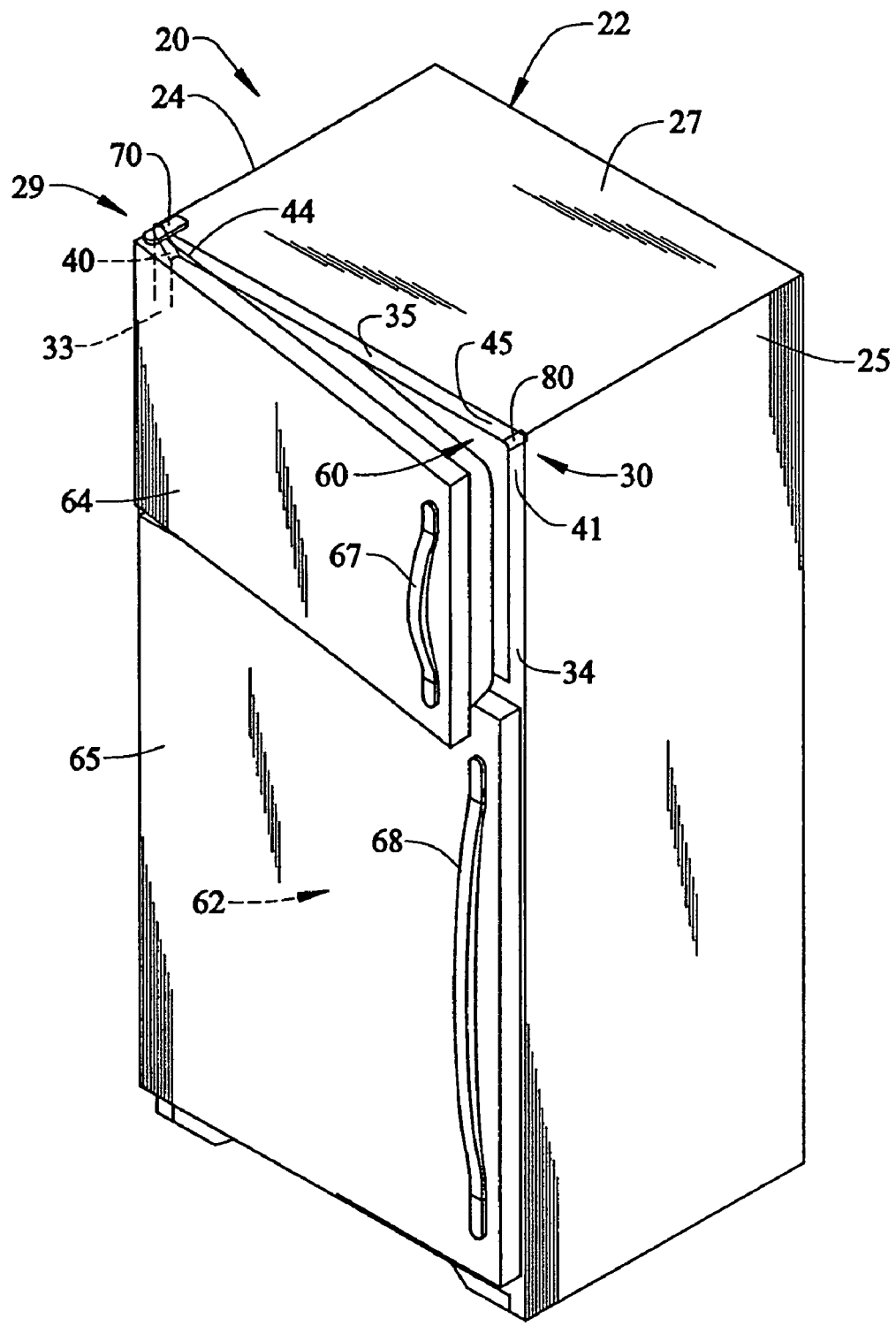
FIG. 2 is an upper right perspective view of a top-mount refrigerator cabinet employing a cover member constructed in accordance with the present invention.

With initial reference to FIG. 2, a refrigerator, generally indicated at 20, includes a cabinet 22. In a manner known in the art, cabinet 22 includes first and second laterally spaced side walls 24 and 25 that are interconnected by a top wall 27 so as to form corner regions 29 and 30. As shown, cabinet 22 is formed out of a single piece of bent sheet metal to which are secured rear and bottom walls (not shown). In the embodiment shown, front edge portions (not separately labeled) of side walls 24 and 25, as well as top wall 27, include respective in-turned flanges 33-35 that form front face portions for cabinet 22. In-turned flanges 33-34 include corresponding end sections 40 and 41, while in-turned flange 35 includes associated end portions 44 and 45. End sections 40 and 41 of flanges 33 and 34 adjoin end portions 44 and 45 of in-turned flange 35 to form an opening 50 (FIG. 6) at corner 30. In a manner also known in the art, refrigerator 20 includes a freezer compartment 60 and a fresh food compartment 62, each having a corresponding door 64, 65 provided with respective handles 67 and 68. In the embodiment shown, doors 64 and 65 are pivotable about a vertical axis defined by a hinge such as indicated at 70. Refrigerator 20, in the embodiment shown, constitutes a top mount model. However, it should be understood that the present invention can be employed in other refrigerator models, including side-by-side and bottom mount configurations.

Figure 3:
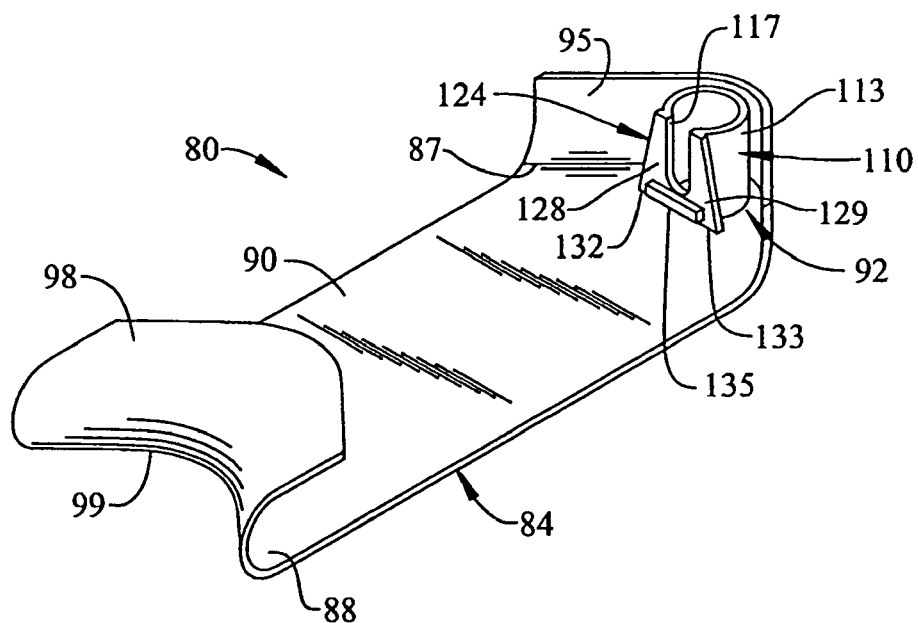
FIG. 3 is an upper right perspective view of the cover member constructed in accordance with the present invention.
Figure 4:
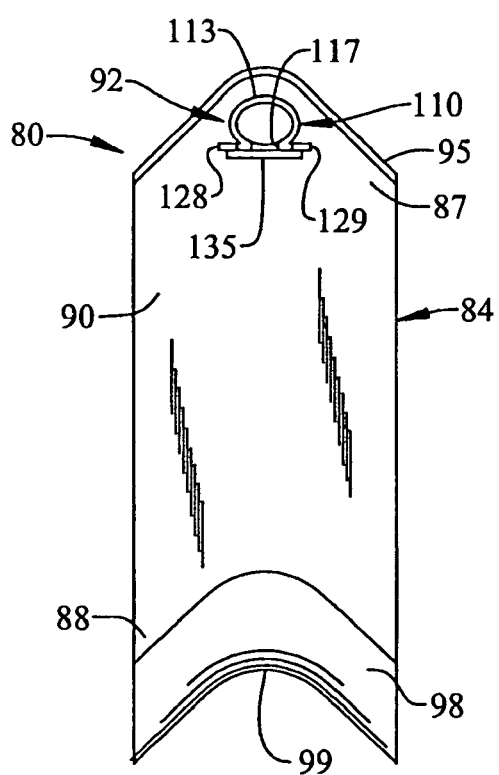
FIG. 4 is a top view of the cover member of FIG. 3.
Figure 5:
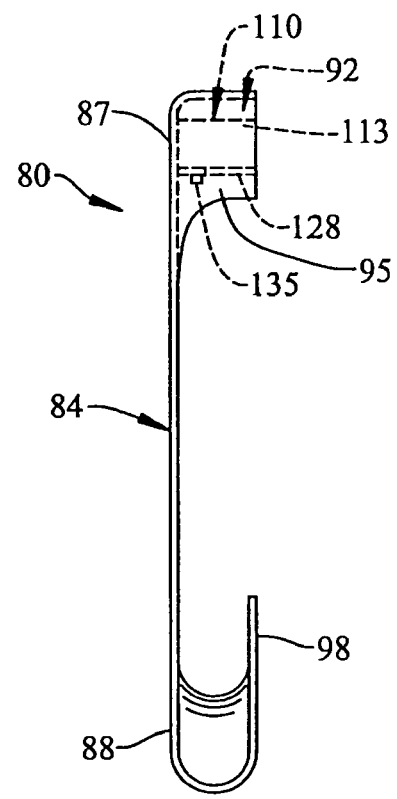
FIG. 5 is a left side view of the cover member of FIG. 3.

In order to provide a more finished appearance to the in-turned flanges or front face portions 33-35 of cabinet 22, a cover member 80 is positioned at each corner region 29, 30 to cover a respective opening 50. In accordance with the present invention, as best shown in FIGS. 3-5, cover member 80 includes a main body portion 84 having a first end 87 that leads to a second end 88 through an intermediate portion 90. In order to secure cover member 80 to opening 50, a tab or peg element 92 is provided at first end 87. In addition, a skirt portion 95 is also provided at first end 87 in order to extend over, for example, a portion of top wall 27 and side wall 25 to establish a more seamless appearance. In further accordance with the invention, second end 88 includes a flexible clip or gripping member 98. Gripping member 98 is adapted to extend around in-turned flanges 33, 35 or 34, 35 so as to secure second end 88 to cabinet 22. More specifically, as cover member 80 is used at corner portions 29 and 30, flexible gripping member 98 is provided with a corner surface portion 99 having a contour designed to nest into corner portion 30 to provide a more finished appearance for cabinet 22 as detailed further below.

In accordance with a preferred embodiment of the present invention, tab element 92 includes a cylindrical projection 110 having an upstanding wall portion 113. Upstanding wall portion 113 actually defines a longitudinal axis for cylindrical projection 110. As shown, a split 117 extends longitudinally along upstanding wall 113 and functionally forms a radial spring. With this arrangement, once tab element 92 is inserted into opening 50, split 117 urges side portions (not separately labeled) of upstanding wall 113 outward to more fully engage with cabinet 22.

In order to more fully secure cover member 80 at corner 30, a hook member 124 is provided at cylindrical projection 110.

Actually, in the most preferred form of the invention, cover member 80 is molded of plastic such that hook member 124 is integrally formed with cylindrical projection 110 on either side of split 117. Hook member 124 includes first and second tapered or angled prongs 128 and 129 that project tangentially from upstanding wall 113 on either side of split 117. Each of first and second prongs 128 and 129 includes a corresponding deformable detent portion 132 and 133 that is adapted to engage with cabinet 22. In addition, a third prong 135 is provided across a bottom portion of hook member 124 between first and second prongs 128 and 129. With this construction, hook member 124 can engage with three separate surfaces of cabinet 22 to more positively retain cover member 80 within opening 50. Actually, as first and second prongs 128 and 129 are provided on opposing sides of longitudinal split 117, the radial spring force established by split 117 urges detent portions 132 and 133 outward to form a more robust connection, as will become evident hereinafter.

Figure 6:
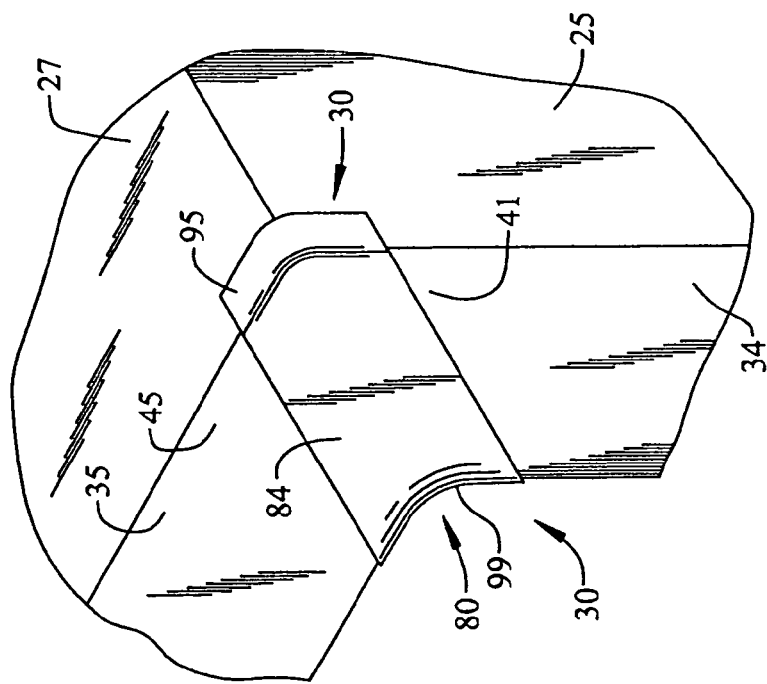
FIG. 6 is an enlarged view of a corner section of the refrigerator of FIG. 1 illustrating the cover member prior to installation.
Figure 7:
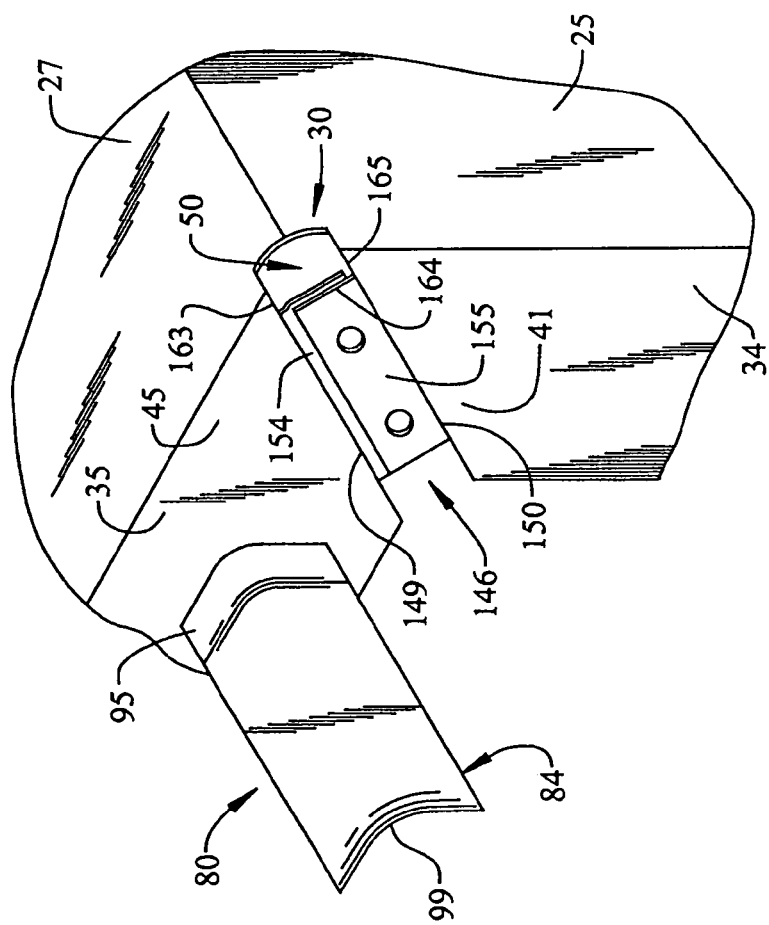
FIG. 7 is an enlarged view of the corner section illustrated in FIG. 6 showing the cover member installed.
Figure 8:
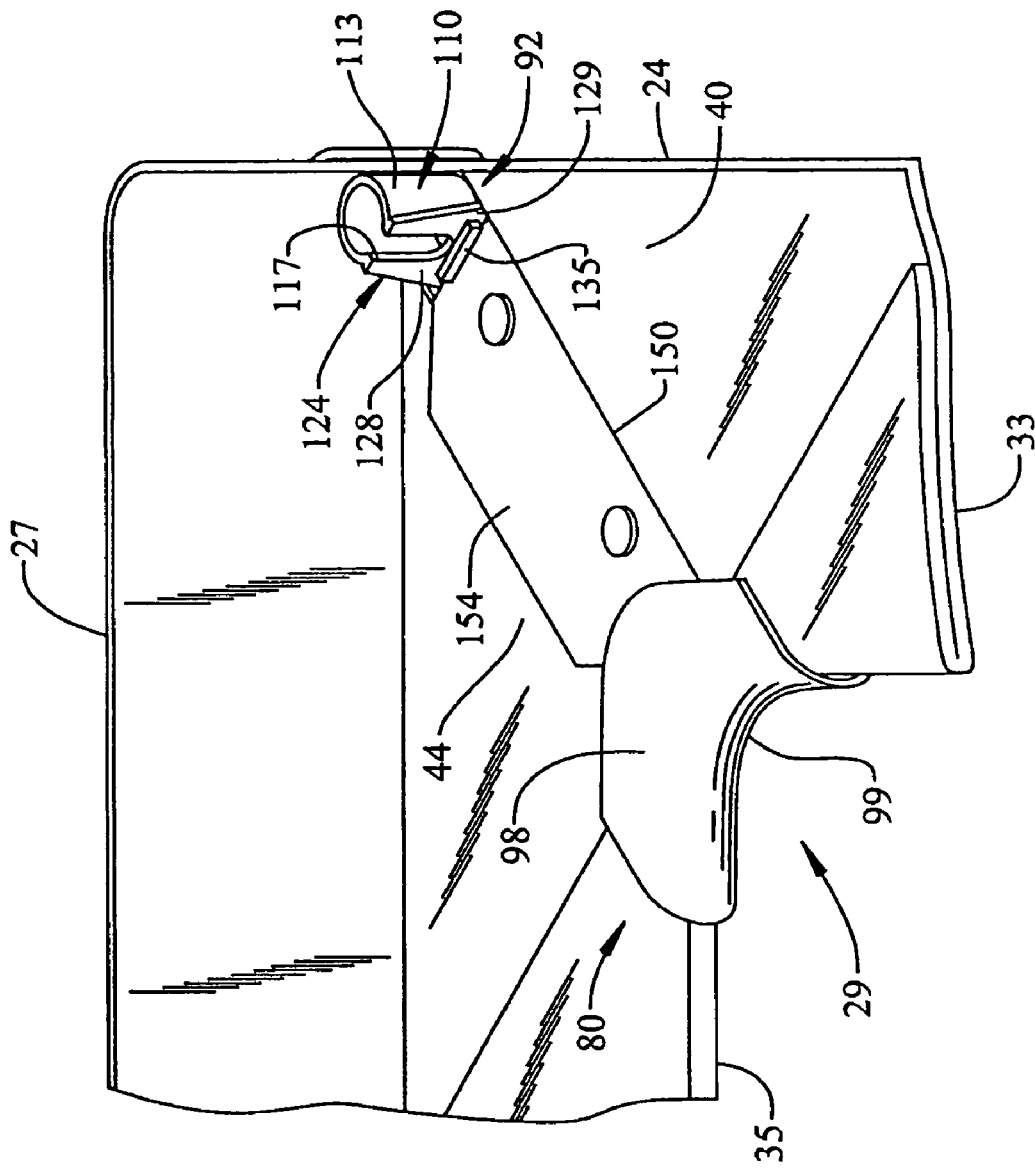
FIG. 8 is a rear view of the corner section of FIG. 7 illustrating a tab element portion of the cover member secured to the cabinet.

Reference will now be made to FIGS. 6-8 in describing a preferred method of attachment of cover member 80 to cabinet 22. As best shown in FIG. 6, opening 50 is actually constituted by a slot. More specifically, end portion 45 of in-turned flange 35 and end section 41 of in-turned flange 34 include corresponding angled portions 149 and 150 such that opening 50 has a substantially uniform width. Extending from each angled portion 149, 150 is a flange element 154, 155. Flange elements 154 and 155 project into opening 50 and are actually mechanically interconnected with one another, such as through a welding operation or the use of mechanical fasteners (not separately labeled), to increase the overall structural integrity of cabinet 22. Of course, other methods of attachment could also be employed. Once flanges 154, 155 are connected, opening 50 is formed having a plurality of substantially straight edge sections 163-165.

Initially, cylindrical projection 110 is inserted into opening 50. Cylindrical projection 110 is inserted until hook member 124 positively engages with edge sections 163-165 of opening 50. More specifically, once cylindrical projection 110 is fully seated within opening 50, first and second prongs 128 and 129 positively engage with edge sections 163 and 165 of opening 50, while third prong 135 of hook member 124 extends under edge section 164, as represented in FIG. 8. Once completely seated, skirt 95 extends across portions of both top wall 27 and side wall 25. At this point, flexible gripping member 98 is deflected and drawn about corner portion 30 so as to clip to or otherwise grip in-turned flanges 34 and 35. In this fashion, cover member 80 provides a robust attachment point to cabinet 22. That is, the combination of longitudinal split 117 biasing prongs 128 and 129 outward to engage multiple edge sections 163 and 165, prong 135 projecting behind flange elements 154 and 155, and gripping member 98 extending around portions of in-turned flanges 34 and 35, ensures that cover member 80 will not inadvertently become loose to undesirably expose unfinished portions of cabinet 22, while providing an aesthetically appealing, finished appearance for cabinet 22. Moreover, the robust attachment point ensures that, during a foaming process where foam is introduced into the cabinet to provide insulation, foam will not escape from opening 50.

Although described with reference to a preferred embodiment of the present invention, it should be readily apparent to one of ordinary skill in the art that various changes and/or modifications can be made to the invention without departing from the spirit thereof. For instance, while the cover member has been described as engaging about an opening defined by three substantially straight sides, the cover could also be employed on openings of different geometries. In addition, although the cover member has been described in relation to a refrigerator, the arrangement could be employed in connection with other appliances or various types of cabinets in general. Finally, although the in-turned flanges defining the front face portions are preferably formed integral with the side and top walls respectively, the top and side walls could have in-turned flange structure attached thereto to define the front face portions. In any case, the invention is only intended to be limited by the scope of the following claims.

I claim:

1. A cabinet including a cover member adapted to extend across the front face of the cabinet at a corner junction of two walls in which the cabinet front face is defined by in-turned flanges on the walls that establish the front face, the in-turned flanges including flange elements that overlap at the junction and define an opening in the front face at the junction of the two walls of the cabinet, the cover member comprising:
    a main body portion having a first end and a second end;
    a tab element provided at the first end of the main body portion, said tab element being formed from a resilient material and comprising a generally cylindrical open topped hollow projection having a top surface generally perpendicular to the longitudinal axis of the projection and a longitudinal slot along a substantial longitudinal portion of the cylindrical projection that creates a radial spring, the cylindrical projection being positioned for insertion into the opening in the front face; and
    a hook member provided at the first end of the main body portion, said hook member including first and second angled prongs connected to and extending along opposing sides of the slot substantially to the top surface, and a third prong provided across a bottom portion of the hook member, said cover member being adapted to be secured to the cabinet overlying the front face at the junction of the walls by inserting the cylindrical projection into the opening with the first, second and third prongs of the hook member engaging the front face at the opening.

2. The cabinet according to claim 1, wherein the in-turned flanges that establish the front face of the cabinet are interconnected at the junction to form three, substantially straight edge sections of the opening.

3. The cabinet according to claim 2, wherein the three prongs on the hook member are adapted to engage with corresponding ones of the three substantially straight edge sections.

4. The cabinet including a cover member according to claim 1, wherein the hook member is integrally formed with the cylindrical projection.

5. The cabinet including a cover member according to claim 4, wherein the three prongs on the hook member are adapted to project through and engage the opening to securely retain the first end of the cover on the cabinet.

6. The cabinet including a cover member according to claim 5, wherein the three prongs project tangentially from the tab element.

7. The cabinet including a cover member according to claim 1, further comprising: a skirt portion provided at the first end of the main body portion, said skirt portion being adapted to extend over portions of the two walls.

8. The cabinet including a cover member according to claim 7, further comprising: a flexible gripping member provided on the second end of the main body portion, said flexible gripping member being adapted to extend over the front face and engage the edges of the in-turned flanges of the adjoining walls to securely retain the second end of the cover on the cabinet.

9. The cabinet including a cover member according to claim 8, wherein the flexible gripping member includes a convex surface.

10. The cabinet including a cover member according to claim 1, wherein the first and second prongs taper relative to the cylindrical projection.

* * * * *